April 8, 1947.  C. EISLER  2,418,763

MACHINE FOR SEALING AND MOLDING GLASS BULBS

Filed Feb. 18, 1944  3 Sheets-Sheet 1

INVENTOR
Charles Eisler,
BY
Wm H Caufield
ATTORNEY

April 8, 1947.  C. EISLER  2,418,763
MACHINE FOR SEALING AND MOLDING GLASS BULBS
Filed Feb. 18, 1944  3 Sheets-Sheet 2
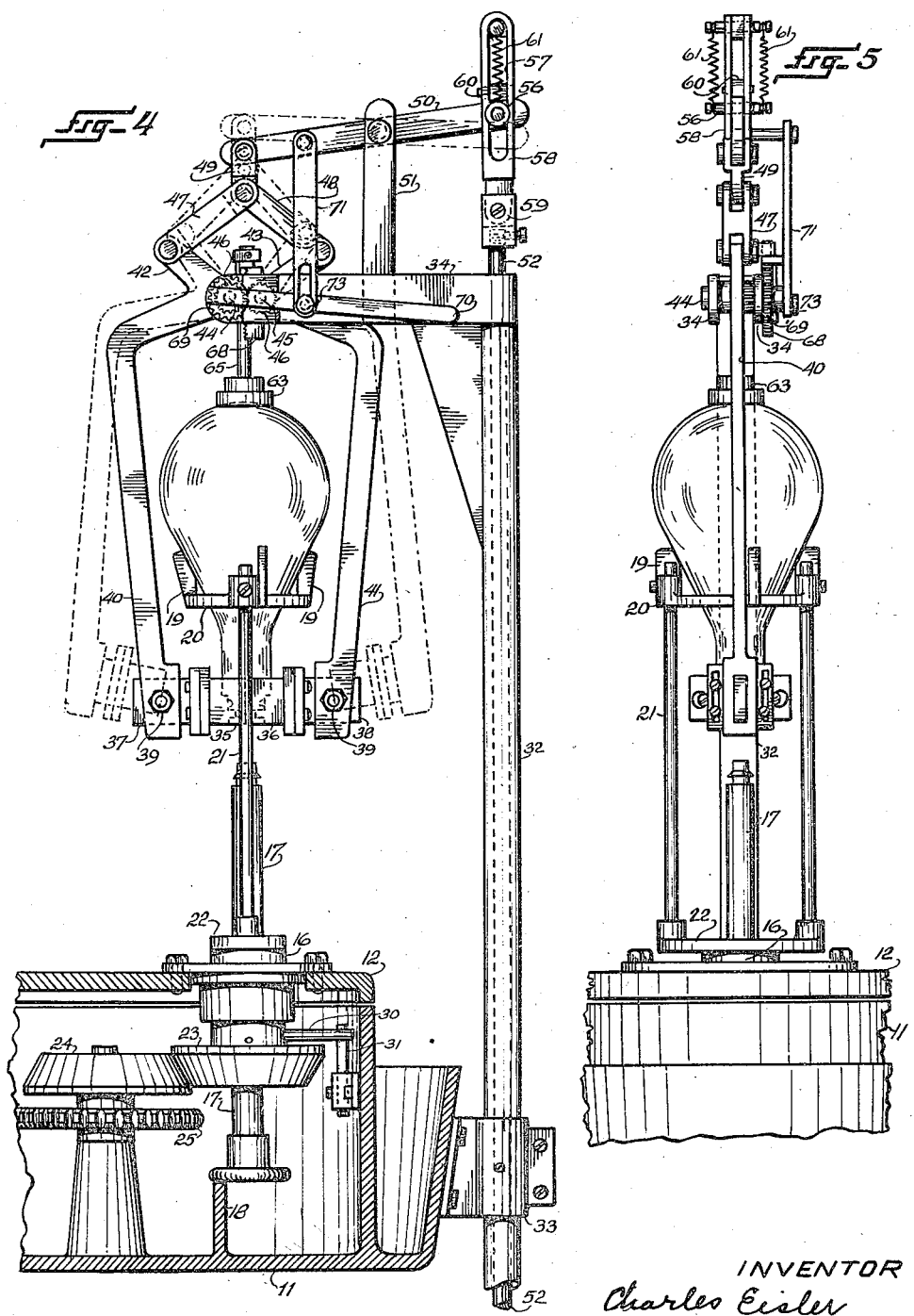
INVENTOR
Charles Eisler,
BY
Wm H Caufield.
ATTORNEY April 8, 1947.  C. EISLER  2,418,763
MACHINE FOR SEALING AND MOLDING GLASS BULBS
Filed Feb. 18, 1944  3 Sheets-Sheet 3
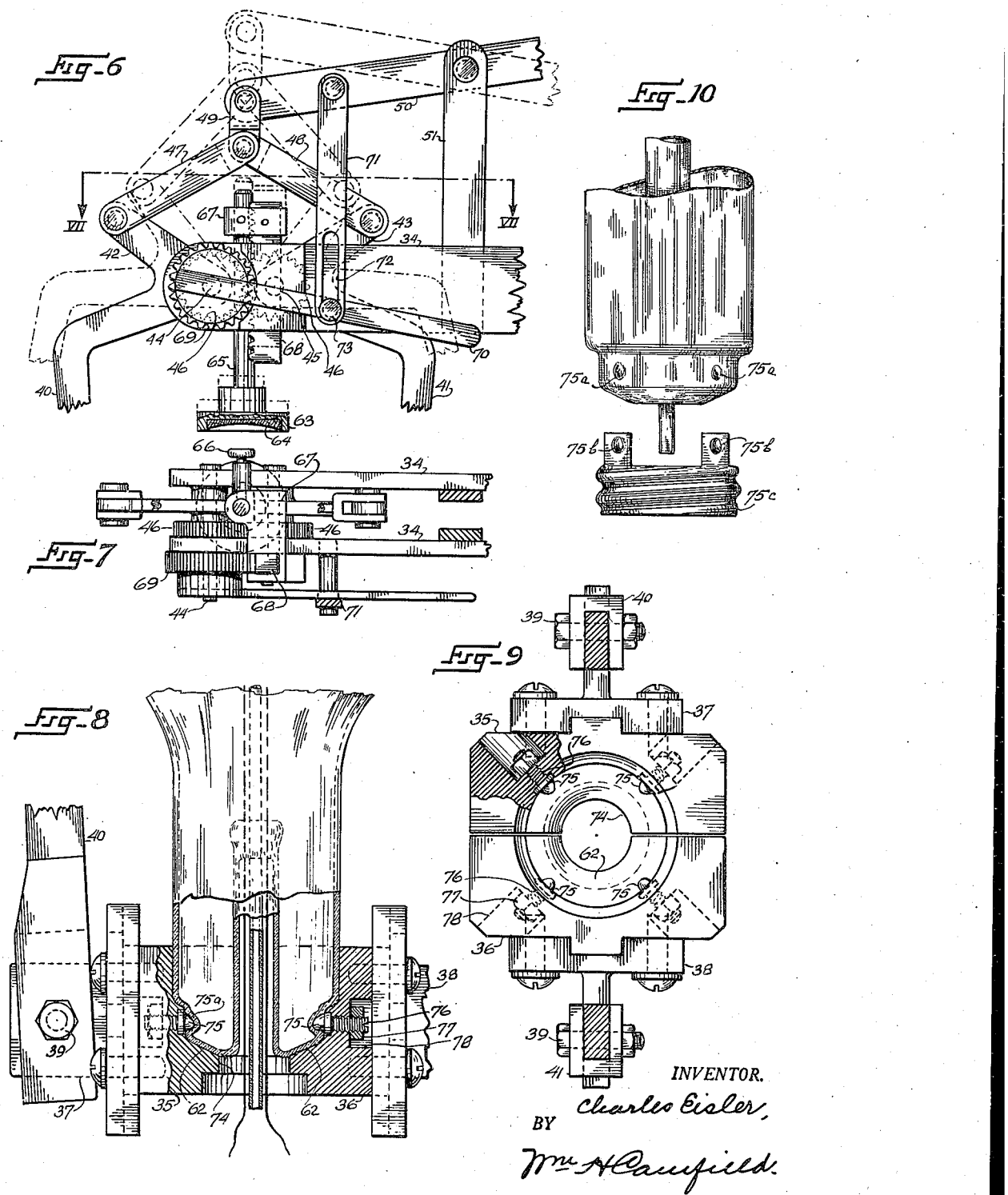
INVENTOR.
Charles Eisler,
BY
Wm H Caufield Patented Apr. 8, 1947

2,418,763

UNITED STATES PATENT OFFICE 2,418,763

MACHINE FOR SEALING AND MOLDING GLASS BULBS

Charles Eisler, South Orange, N. J.

Application February 18, 1944, Serial No. 522,942

1 Claim. (Cl. 49—2)

This invention relates to an improved machine for sealing and molding glass bulbs in proper sequence in order to produce a bulb with a neck prepared to receive a screw cap or collar, the collar having spring arms with projections, the neck of the bulb having recesses with which the projections engage when the two parts are assembled.

The invention is designed to provide a machine in which molds for forming the indented neck of the bulb are resiliently closed from opposite sides of the bulb while the bulb is held seated and aligned.

The machine of this invention is designed to seal the bulb at one stage of the bulb's progress on the machine and then mold the sealed part into a neck having a tapered or sloping bottom with due regard to the prevention of an accumulation of plastic glass at the previously sealed joint. This eliminates the presence of internal stresses later in the cooled product.

The invention also relates to details of construction of the sealing and molding mechanisms which will be hereinafter more fully described and also embodied in the claim.

Figure 1:
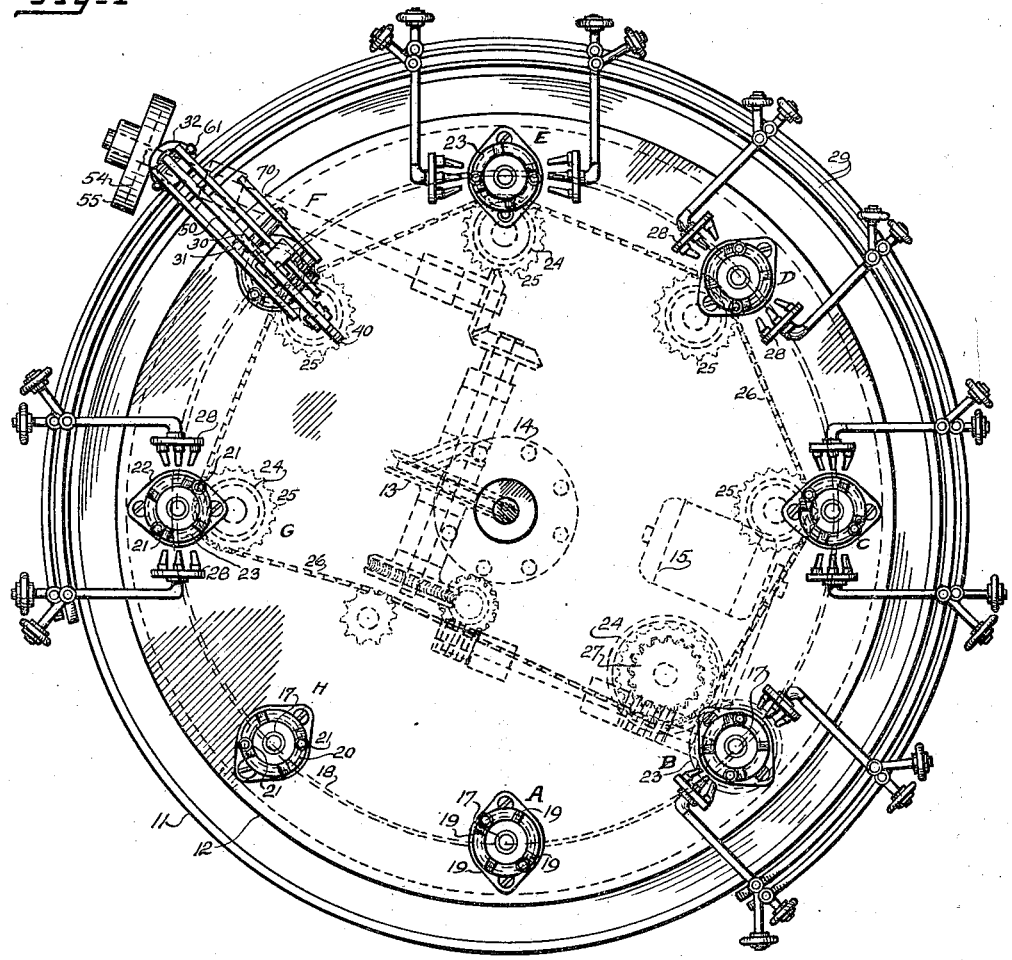
Figure 2:
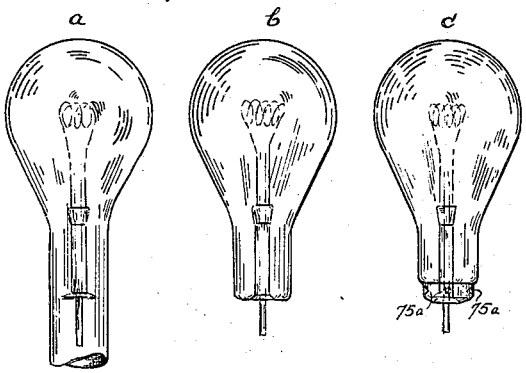
Figure 3:
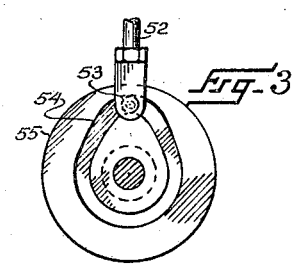

The invention is illustrated in the accompanying drawings, in which Figure 1 is a plan view of the machine showing the disposition of the sealing head and molding units. Figure 2 illustrates the bulb and stem in the three main stages of manufacture as *a* before sealing, *b* after sealing and *c* after molding. Figure 3 illustrates the cam which actuates the molding mechanism. Figure 4 is a fragmentary elevational view, partly in section, taken at station F in Fig. 1 illustrating the molding mechanism and the means for rotating and stopping the sealing heads. Figure 5 is another view of the molding mechanism. Figure 6 is a detail of the mold-operating mechanism. Figure 7 is a plan view of Figure 6 taken on line VII—VII thereof. Figure 8 is a partially sectional view of the molds with the bulb in position after molding. Figure 9 is a plan view of the molds. Figure 10 illustrates the lower part of a bulb after molding with a collar ready for attachment thereto.

In the manufacture of glass bulbs, as for electric light or for electronic purposes it has been found necessary to shape the neck of the bulb after sealing to conform with the fittings employed by some manufacturers for attaching the metal screw cap. In some instances the screw cap is screwed to an inner collar provided with lugs having projections on the inner faces thereof, which are snapped into corresponding indentations in the neck of the bulb, the said lugs being subsequently squeezed into the bulb neck by the perforated rim of the screw cap.

In order to mold the bulb neck to the desired shape without using a second machine, the sealing mechanism has been provided with a molding mechanism which is operated directly after the sealing process is completed.

In its essential features, the sealing mechanism does not vary from a commercial type now in use and a brief description will suffice. Referring to the drawings it will be seen that the machine comprises a base 11 on which is rotatably mounted the spider 12. The spider is intermittently rotated by suitable indexing mechanism such as the barrel cam 13 which periodically engages and shifts the indexing disc 14 which is fixed to the spider. The barrel cam is operated through the usual speed reduction mechanism from the motor 15. On the spider are secured the sealing rod guides 16 in which are sealing rods, 17, which rotate in the guides. The raising and lowering of the sealing rods is effected by the cam track 18 in the base 11. The glass bulb is seated on the cleats 19 carried by the collar 20 which is supported by the stanchions 21 and rotates with the flange plate 22 of the sealing rod.

The rotation of the sealing rod and the glass bulb is effected by a friction cone transmission, the sealing head having a cone 23 frictionally engaging the cone 24 rotative with the sprocket 25. The sprockets 25 are driven by the sprocket chain 26 from the driving sprocket 27 actuated through the usual speed reduction means by the motor 15.

The glass bulbs pass through the usual processes of sealing, progressing from station A which is the loading station to station E where the sealing operation is completed and where the neck of the bulb is again heated in order to render the glass sufficiently plastic for the molding operation, gas and air being fed to the burners 28 from the supply pipes 29.

At station F it is necessary to stop the rotation of the glass bulb in order to permit the molding operation to be performed. This stoppage is caused by the contact of the horizontal pin 30 fixed in the hub of the cone 23, with the fixed stop such as the pin 31 in the base, and the cone 24 then slips on the cone 23. At the next movement of the spider the pin 30 disengages itself from the pin 31 and the sealing head will therefore rotate again at the next station G where there is no vertical pin to stop it.

The molding mechanism which is shown as situated at station F is mounted on the standard 32 secured to the base as at 33, the standard being provided with the spaced horizontal brackets 34 at the top of the standard, the mechanism for operating the mold being mounted between the brackets. The mold comprises two halves 35 and 36 secured to the supports 37 and 38 rotatably adjustable by the screws 39 in the mold arms 40 and 41 relatively to each other so that they will be properly aligned when closed. Their position is thus originally fixed, and may be corrected in use to compensate for wear, by loosening the screws 39, rotating the halves 35 and 36, and then tightening the screws.

The mold has a conical bottom 62 sloping upwardly and outwardly from the circular aperture 74, the diameter of which exceeds that of the stem of the bulb so that when the two halves of the mold come together against the neck of the bulb the plastic glass is prevented from accumulating at the previously sealed joint, thus eliminating internal stresses in the bulb which would otherwise result. The lower vertical wall of the mold is provided with projections or buttons 75, usually in the form of ends from the cap screws 76 which are secured by the nuts 77 in the holes 78 in the bodies of the mold. The buttons 75 make the dents 75a in the reduced neck of the bulb which are spaced so as to register with the projections 75b formed by externally denting the lugs of the screw collar 75c. This is the object of the molding operation. In order to facilitate the retraction from the bulb neck after molding and to provide for the withdrawal of the studs or buttons from the glass without marring the indentations, the studs are slightly flattened on their under sides, as will be evident from Figure 8.

The mold arms, provided with bell-crank arms 42 and 43 are mounted on the pins 44 and 45 journalled in the brackets 34. The meshing spur gears 46 fixed on the pins 44 and 45 insure equal and smooth rotation or swinging of the mold arms. The bell cranks 42 and 43, through the toggle links 47 and 48 pivoted to link 49 are actuated by the lever 50 fulcrumed on the support 51. The lever 50 is raised and lowered by the lift rod 52 slidable within the standard 32, the lift rod 52 being provided with the cam roller 53 at its lower end, Fig. 3, engaging the closed cam track 54 of the cam 55 which is rotated from the barrel cam shaft by the transmission means shown.

In order to insure yielding movement and contact of the mold with the plastic neck of the glass bulb, the lever 50 is provided with the pin 56 which is slidable in the slots 57 of the furcations of bifurcated guide bracket 58, the bracket having pivot mounting 59 on the lift rod 52 whereby any binding of the lever during its arcuate travel is prevented.

The stop-block 60 fixed in the bracket 58 depresses the lever on the downward stroke of the lift rod and causes the mold to open, the arms 50 then separating and diverging as indicated by the dotted lines. On the up-stroke of the rod, causing the closing of the mold, the lever 50 is raised by the springs 61 which cause the molds to close comparatively gently and resiliently against the resistance of the plastic glass.

During the molding operation it is essential that the bulb should be held against rising and not be lifted from the cleats 19 by the upward pressure exerted by the sloping or cone-shaped bottom 62 of the mold members. This is done to prevent the bulb being moved out of vertical alignment and also preventing the indentations made by the mold from being too low and thus providing an inaccurate location for reception of the projections on the screw collar. In order to hold the bulb in position on the cleats the disc 63 is provided. The disc has a hollowed bottom in which a dished lining 64 of asbestos or similar material is placed, the slightly compressible material of the lining being adapted to bear down on the top of the bulb. The disc 63 is mounted on the vertical rod 65 fixed by the set-screw 66 in the carrier 67 from which depends the vertically extending rack 68 meshing with the rack gear 69 rotatable on the pin 44 and operated solely by the lever 70 and the link 71. The lever 70 is secured to gear 69 and has adjustable connection by the slotted link 71 with the mold operating lever 50. The vertical position of the disc 63 can be regulated by adjusting the lever 70 in the slot 72 by means of the adjusting screw 73. After the molding is completed the bulbs are subjected to the usual annealing process at station G and is then unloaded at station H.

It will be evident that a bulb may be sealed and also molded to receive the screw collar of the attaching fixture without removing the bulb from the machine.

I claim:

In a machine for molding glass bulbs, comprising a bulb support, a molding mechanism comprising a standard, bell crank arms pivoted on the standard, a lift rod, a pivoted arm and links connecting the lift rod and the bell crank arms, molds at the ends of the bell crank arms, spring means in said machine selectively compressed and expanded responsive to movement of said lift rod for softening the approach and the pressure of the molds on the bulb, a disc for engaging the top of the bulb and slidable in the molding mechanism standard, a rack for moving the disc, a pinion in engagement with the rack, an arm for moving the pinion, and a link connecting the pivoted arm for operating the mold bell crank arms and the arm for moving the pinion whereby the disc is caused to engage the top of the bulb when the molds engage the bottom of the bulb.

CHARLES EISLER.

REFERENCES CITED

The following references are of record in the file of this patent:

UNITED STATES PATENTS

| Number | Name | Date |
|---|---|---|
| 1,617,112 | Higgins | Feb. 8, 1927 |
| 2,203,917 | Malloy | June 11, 1940 |
| 2,212,842 | McGowan | Aug. 27, 1940 |
| 1,338,500 | Eisler | Apr. 27, 1920 |
| 1,640,442 | De Jong | Aug. 30, 1927 |
| 2,006,231 | Malloy et al. | June 25, 1935 |
| 1,832,751 | Thomas | Nov. 17, 1931 |

FOREIGN PATENTS

| Number | Country | Date |
|---|---|---|
| 385,537 | British | Dec. 29, 1932 |
| 81,253 | Swedish | June 21, 1934 |